(12) United States Patent
Chen et al.

(10) Patent No.: US 8,704,996 B2
(45) Date of Patent: Apr. 22, 2014

(54) CHOLESTERIC LIQUID CRYSTAL DEVICE WITH REFLECTION ELECTRODES AND PARTITION STRUCTURES

(75) Inventors: Kuan-Ting Chen, Tainan (TW); Yi-Shou Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 536 days.

(21) Appl. No.: 13/092,896

(22) Filed: Apr. 22, 2011

(65) Prior Publication Data
US 2012/0099062 A1      Apr. 26, 2012

(30) Foreign Application Priority Data

Oct. 25, 2010   (TW) .............................. 99136262 A

(51) Int. Cl.
| G02F 1/13 | (2006.01) |
| G02F 1/1335 | (2006.01) |
| C09K 19/02 | (2006.01) |
| G02B 3/08 | (2006.01) |
| G01J 3/45 | (2006.01) |
| G02F 1/137 | (2006.01) |

(52) U.S. Cl.
CPC .................................. *G02F 1/13718* (2013.01)
USPC ............. 349/198; 349/18; 349/115; 349/175; 349/185; 359/742; 356/454

(58) Field of Classification Search
CPC ............... G02F 1/13718; G02F 2001/13478; G02F 2001/133543; G02F 1/133536; G02F 1/1347; G02F 1/13476; G02F 1/133514; G02F 1/1334; G02F 1/133553; G02F 2001/13775; G02F 1/133377; G02F 1/13473; G02F 2203/34; G02F 1/133555

USPC ................. 349/115, 179, 185, 198; 356/454; 359/260

See application file for complete search history.

(56) References Cited

U.S. PATENT DOCUMENTS

| 4,653,864 | A | 3/1987 | Baron et al. |
| 6,133,895 | A | 10/2000 | Huang |
| 6,154,190 | A | 11/2000 | Yang et al. |
| 6,449,439 | B1 | 9/2002 | Boyd et al. |
| 6,704,073 | B2 | 3/2004 | Stephenson et al. |

(Continued)

FOREIGN PATENT DOCUMENTS

| TW | 561497 | 11/2003 |
| TW | 200427823 | 6/2007 |
| TW | 200724982 | 7/2007 |
| TW | 200905733 | 2/2009 |

OTHER PUBLICATIONS

M. W. Miles, "5.3: Digital Paper™: Reflective Displays Using Interferometric Modulation," SID Symposium Digest of Technical Papers, May 2000, pp. 32-35, vol. 31, Issue 1, SID, US.

(Continued)

*Primary Examiner* — Hoan C Nguyen

(57) ABSTRACT

A cholesteric liquid crystal device is provided. The cholesteric liquid crystal device includes a first substrate, a second substrate disposed opposite to the first substrate, a first reflective layer disposed over the first substrate, a second reflective layer disposed over the second substrate, facing the first reflective layer, and a partition structure disposed between the first and the second substrates, wherein a cavity is formed by the partition structure, the first reflective layer and the second reflective layer, and a cholesteric liquid crystal layer is filled in the cavity.

19 Claims, 4 Drawing Sheets

(56) References Cited

U.S. PATENT DOCUMENTS

| | | | |
|---|---|---|---|
| 6,717,640 B2 * | 4/2004 | Sato et al. ............... 349/112 |
| 6,819,309 B1 | 11/2004 | Kishi | |
| 6,850,152 B1 | 2/2005 | Woodall et al. | |
| 6,867,821 B2 | 3/2005 | De Schipper | |
| 6,961,036 B2 | 11/2005 | Chen et al. | |
| 7,024,153 B2 | 4/2006 | Weiner et al. | |
| 7,046,239 B2 | 5/2006 | Asai et al. | |
| 7,190,337 B2 | 3/2007 | Miller, IV et al. | |
| 7,195,813 B2 | 3/2007 | Burberry et al. | |
| 7,206,115 B2 | 4/2007 | Hikichi et al. | |
| 7,229,663 B2 | 6/2007 | Stephenson et al. | |
| 7,245,346 B2 | 7/2007 | Weiner et al. | |
| 7,307,776 B2 | 12/2007 | Tsai et al. | |
| 7,372,530 B2 | 5/2008 | Stephenson et al. | |
| 7,638,780 B2 | 12/2009 | Kilburn et al. | |
| 7,648,645 B2 | 1/2010 | Roberts et al. | |
| 8,330,931 B2 * | 12/2012 | Coles et al. ............... 349/185 |
| 2006/0182898 A1 | 8/2006 | Ben-Shalom et al. | |
| 2008/0042959 A1 | 2/2008 | Ben-Shalom et al. | |
| 2008/0186581 A1 | 8/2008 | Bita et al. | |
| 2008/0198173 A1 | 8/2008 | Coates et al. | |
| 2009/0103027 A1 | 4/2009 | Hughes et al. | |
| 2009/0161034 A1 | 6/2009 | Coates et al. | |
| 2009/0174643 A1 | 7/2009 | Ben Shalom et al. | |
| 2009/0189847 A1 | 7/2009 | Hughes et al. | |
| 2009/0279024 A1 | 11/2009 | Coates et al. | |
| 2009/0303259 A1 | 12/2009 | Shalom et al. | |
| 2010/0134706 A1 | 6/2010 | Yang et al. | |
| 2011/0122358 A1 * | 5/2011 | Kim et al. ............... 349/156 |

OTHER PUBLICATIONS

Weiwei Zhang et al., "Full Color Organic Light-Emitting Devices with Microcavity Structure and Color Filter," Optics Express, May 2009, pp. 8005-8011, vol. 17, No. 10, OSA, US.

Brian J. Gally, "P-103: Wide-Gamut Color Reflective Displays Using iMoD™ Interference Technology," SID Symposium Digest of Technical Papers, May 2004, pp. 654-657, vol. 35, Issue 1, SID, US.

Jin Cao et al., "RGB Tricolor Produced by White-Based Top-Emitting Organic Light-Emitting Diodes with Microcavity Structure," Current Applied Physics, Mar. 2007, pp. 300-304, vol. 7, Issue 3, Elseriver B.V., US.

\* cited by examiner

(12) United States Patent
US 8,704,996 B2

CHOLESTERIC LIQUID CRYSTAL DEVICE WITH REFLECTION ELECTRODES AND PARTITION STRUCTURES

CROSS REFERENCE TO RELATED APPLICATIONS

This Application claims priority of Taiwan Patent Application No. 99136262, filed on Oct. 25, 2010, the entirety of which is incorporated by reference herein.

BACKGROUND OF THE INVENTION

1. Field of the Invention

The invention relates to a cholesteric liquid crystal display.

2. Description of the Related Art

Currently, conventional cholesteric liquid crystal displays require at least three colors of cholesteric liquid crystal materials to achieve a full color image display. For example, three colors of a red cholesteric liquid crystal panel, a green cholesteric liquid crystal panel and a blue cholesteric liquid crystal panel are stacked to form a three-layered structure to achieve a full color image display. In another way, three colors of a red cholesteric liquid crystal, a green cholesteric liquid crystal and a blue cholesteric liquid crystal are respectively filled in the same panel in a vacuum by a pixelized vacuum filling (PVF) process to achieve a full color image display. However, the conventional full color cholesteric liquid crystal displays need at least three colors of cholesteric liquid crystal materials, thus the material cost of the conventional full color cholesteric liquid crystal displays is high. Moreover, the conventional full color cholesteric liquid crystal displays require a long time for fabrication to be completed.

BRIEF SUMMARY OF THE INVENTION

According to an embodiment of the invention, a cholesteric liquid crystal device is provided. The cholesteric liquid crystal device includes a first substrate and a second substrate disposed opposite to the first substrate. A first reflective layer is disposed over the first substrate and a second reflective layer is disposed over the second substrate, facing the first reflective layer. A partition structure is disposed between the first and the second substrates. At least a first cavity is formed by the partition structure, the first reflective layer and the second reflective layer, and the first cavity has a first optical length. A cholesteric liquid crystal layer is filled in the first cavity.

According to an embodiment of the invention, another cholesteric liquid crystal device is provided. The cholesteric liquid crystal device includes a first substrate and a second substrate disposed opposite to the first substrate. A first reflective layer is disposed over the first substrate and a second reflective layer is disposed over the second substrate, facing the first reflective layer. A partition structure is disposed between the first and the second substrates to form a first cavity, a second cavity and a third cavity between the partition structure, the first reflective layer and the second reflective layer, wherein the first cavity has a first optical length, the second cavity has a second optical length and the third cavity has a third optical length. A cholesteric liquid crystal layer is filled in the first cavity, the second cavity and the third cavity.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The embodiments of the invention provide cholesteric liquid crystal devices which use a single cholesteric liquid crystal material to cooperate with cavities of different optical lengths to form the cholesteric liquid crystal devices and achieve full color image displays.

Figure 1:
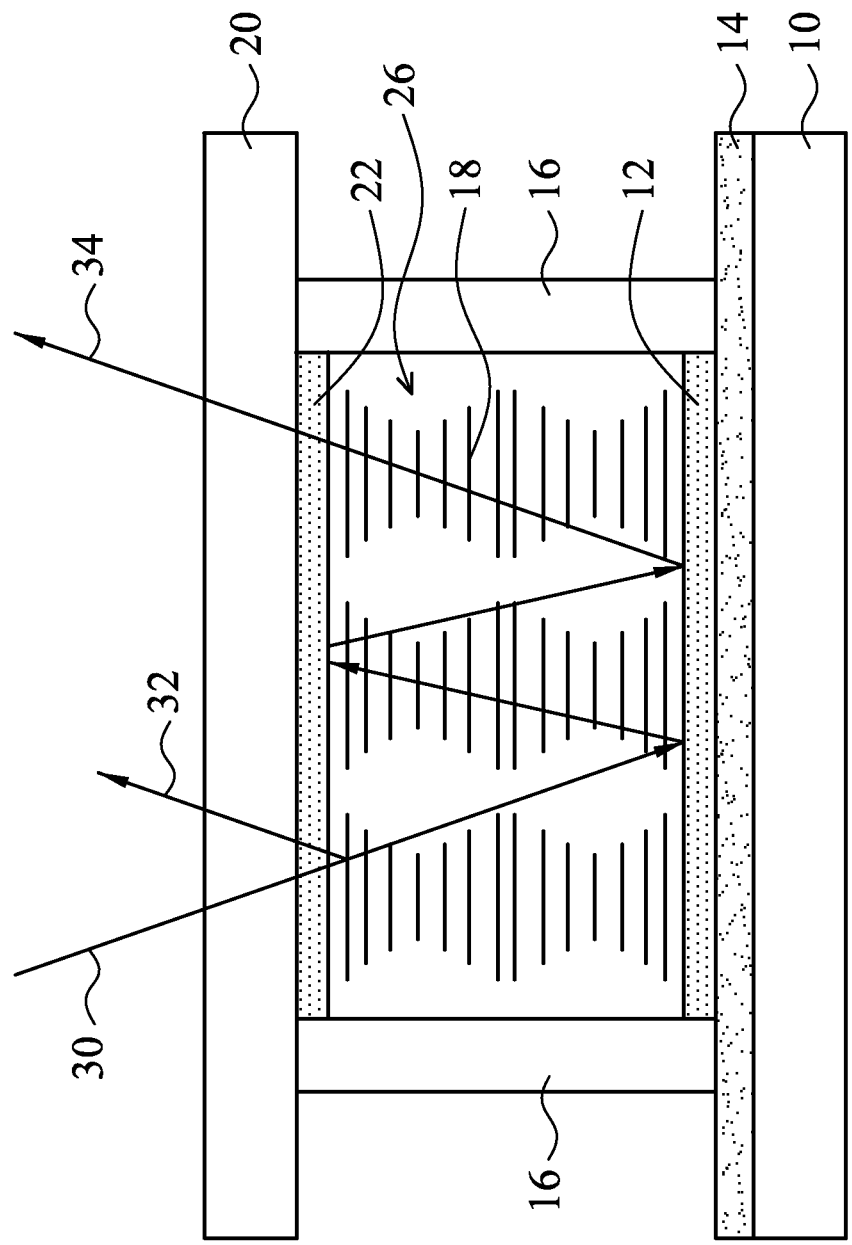
FIG. 1 shows a schematic cross section of one cavity structure of a cholesteric liquid crystal device according to an embodiment of the invention, wherein the cholesteric liquid crystal device is operated in a bright mode.

Referring to FIG. 1, a cross section of one cavity structure of a cholesteric liquid crystal device according to an embodiment of the invention is shown, wherein the cholesteric liquid crystal device is operated in a bright mode. The cholesteric liquid crystal device has an upper substrate 20 and a lower substrate 10. The upper substrate 20 and the lower substrate 10 may be transparent substrates, such as a glass substrate or a flexible substrate, for example a plastic substrate. A plurality of walls 16 is disposed between the upper substrate 20 and the lower substrate 10. In a space surrounded by the walls 16, the upper substrate 20 and the lower substrate 10, a rear reflective layer 12 is formed on the lower substrate 10 and a front reflective layer 22 is formed on the upper substrate 20, facing the rear reflective layer 12. Accordingly, a cavity 26 is formed between the front reflective layer 22, the rear reflective layer 12 and the walls 16. Then, a cholesteric liquid crystal layer 18 is filled in the cavity 26.

The cavity 26 can be a Fabry-Perot cavity, which produces an optical interference effect satisfying the below formula:

$$2L/\lambda - \Phi/2\pi = m \qquad \text{formula 1,}$$

wherein L is an optical length of the cavity between the front reflective layer and the rear reflective layer, $\Phi$ is the sum of reflective phase differences, m is an integral, and $\lambda$ is a resonance wavelength produced from the cavity.

The optical length L is obtained by the below formula:

$$L = n \times t \qquad \text{formula 2,}$$

wherein n is a refractive index of the material filled in the cavity, i.e. the refractive index of the cholesteric liquid crystal layer 18, and t is a substantial thickness of the material filled in the cavity, i.e. the substantial thickness of the cholesteric liquid crystal layer 18.

According to the formula 1, a specific wavelength of a light reflected by the cavity is determined by the optical length of the cavity. Therefore, light with different wavelengths can be radiated from a cholesteric liquid crystal device to achieve a full color image display through using cavities of different optical lengths in the cholesteric liquid crystal device. The optical length of the cavity can be determined by a thickness of the cholesteric liquid crystal layer 18, such that a light color displayed by the cholesteric liquid crystal device can be adjusted through controlling the thickness of the cholesteric liquid crystal layer 18.

As shown in FIG. 1, in a bright operation mode, the cholesteric liquid crystal layer 18 is of a planar texture (P state). When an external light 30 enters the cholesteric liquid crystal device, the cholesteric liquid crystal layer 18 reflects a certain-handed light 32 of a certain wavelength band, and a right-handed and left-handed light of the other wavelength band pass through the cholesteric liquid crystal layer 18. The right-handed and left-handed incident light entering the cholesteric liquid crystal layer 18 has a light of a certain wavelength, which produces a constructive interference between the front reflective layer 22 and the rear reflective layer 12 of the cavity 26 to form a light 34 of a certain wavelength. The light 34 of the certain wavelength is reflected by the rear reflective layer 12 and passes through the cholesteric liquid crystal layer 18 to display a certain color light on the cholesteric liquid crystal device.

In an embodiment, the cholesteric liquid crystal layer 18 is a monochromatic cholesteric liquid crystal with a reflection spectrum in an invisible light wave band, which reflects a certain-handed invisible light, for example a left-handed or a right-handed infrared (IR) light or ultraviolet (UV) light, and a left-handed and right-handed visible light enter the cholesteric liquid crystal layer 18. The left-handed and right-handed visible light of a certain wavelength in the cavity 26 produces a constructive interference to form a certain color light, for example a left-handed and right-handed blue light, green light or red light, and then the certain color light is reflected by the rear reflective layer 12 to display a blue light, green light or red light.

In another embodiment, the cholesteric liquid crystal layer 18 is a monochromatic cholesteric liquid crystal with a reflection spectrum in a visible light of a certain wavelength, which reflects a certain-handed visible light of the certain wavelength, for example a left-handed or a right-handed red light, and a left-handed and right-handed visible light of the other wavelength, for example a left-handed and a right-handed green light and blue light enter the cholesteric liquid crystal layer 18. The left-handed and right-handed visible light of a certain wavelength in the cavity 26 produces a constructive interference to form a certain color light, and then the certain color light is reflected by the rear reflective layer 12. The certain color left-handed and right-handed visible light reflected by the rear reflective layer 12 mix with the left-handed or right-handed red light reflected by the cholesteric liquid crystal layer 18 to produce a color mixture and to form another color of light which is different from the certain color light and the red light.

In an embodiment, the front reflective layer 22 and the rear reflective layer 12 may be a half-transmission and half-reflection reflective layer, which is referred to as a transflective layer. The material of the front reflective layer 22 and the rear reflective layer 12 may be a metal, for example gold, silver, aluminum or alloys thereof. The material of the front reflective layer 22 may be the same as or different from that of the rear reflective layer 12. In an embodiment, the front reflective layer 22 and the rear reflective layer 12 can be used as an upper electrode layer and a lower electrode layer, respectively, of the cholesteric liquid crystal device 100. In an embodiment, a thickness of the transflective layer may be in a range between about 5 nm and about 1000 nm. When the rear reflective layer 12 is a transflective layer, a black light absorption layer 14 may be formed on the lower substrate 10 to absorb a visible light passing through the rear reflective layer 12. The material of the black light absorption layer 14 may be a black photo-resist, which can be disposed between the rear reflective layer 12 and the lower substrate 10 or disposed on a backside of the lower substrate 10.

In another embodiment, the front reflective layer 22 is a transflective layer and the rear reflective layer 12 is an all-reflective layer. The materials of the front reflective layer 22 and the rear reflective layer 12 may be a metal, for example gold, silver, aluminum or alloys thereof. The material of the front reflective layer 22 may be the same as or different from that of the rear reflective layer 12. In an embodiment, the front reflective layer 22 and the rear reflective layer 12 can be used as an upper electrode layer and a lower electrode layer, respectively, of the cholesteric liquid crystal device 100. In an embodiment, a thickness of the all-reflective layer may be in a range between about 10 nm and about 1000 nm. When the rear reflective layer 12 is an all-reflective layer, it does not require a black light absorption layer disposed between the lower substrate 10 and the rear reflective layer 12.

Figure 2:
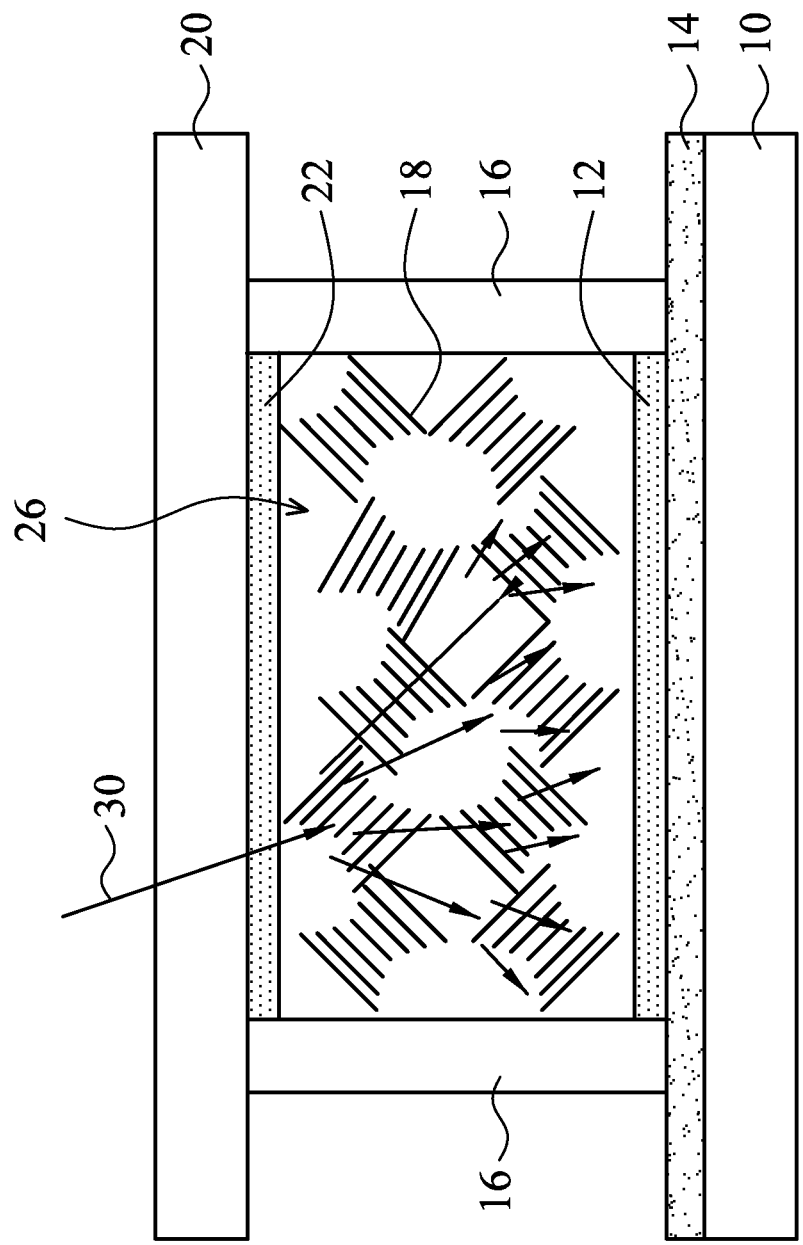
FIG. 2 shows a schematic cross section of one cavity structure of a cholesteric liquid crystal device according to an embodiment of the invention, wherein the cholesteric liquid crystal device is operated in a dark mode.

Referring to FIG. 2, a cross section of one cavity structure of a cholesteric liquid crystal device according to an embodiment of the invention is shown, wherein the cholesteric liquid crystal device is operated in a dark mode. The structure of the cavity 26 of FIG. 2 is the same as that of FIG. 1 and it is not repeated again to simplify the description. The difference between FIG. 2 and FIG. 1 is that the cholesteric liquid crystal layer 18 filled in the cavity 26 of FIG. 2 is of a focal conic texture (F state). When an external light 30 enters the cholesteric liquid crystal device, an incident light is scattered by the cholesteric liquid crystal layer 18. Therefore, it cannot produce a constructive interference in the cavity 26 and there is no light of a certain wavelength reflected by the rear reflective layer 12. In an embodiment, when the rear reflective layer 12 is a transflective layer and a black light absorption layer 14 is disposed on the lower substrate 10, a light passing through the rear reflective layer 12 is absorbed by the black light absorption layer 14. Thus, pixels of the cholesteric liquid crystal device display a dark state to satisfy the requirement for a display.

In the embodiments of the invention, the cholesteric liquid crystal devices can utilize of a planar texture (P state) cholesteric liquid crystal material to cooperate with cavities of different optical lengths to achieve a full color image display. Moreover, the cholesteric liquid crystal devices can utilize of a focal conic texture (F state) cholesteric liquid crystal material to cooperate with the structure design of the rear reflective layer and the black light absorption layer to achieve a dark state display. Therefore, the cholesteric liquid crystal devices according to the embodiments of the invention can be used for a full color cholesteric liquid crystal display.

Figure 3:
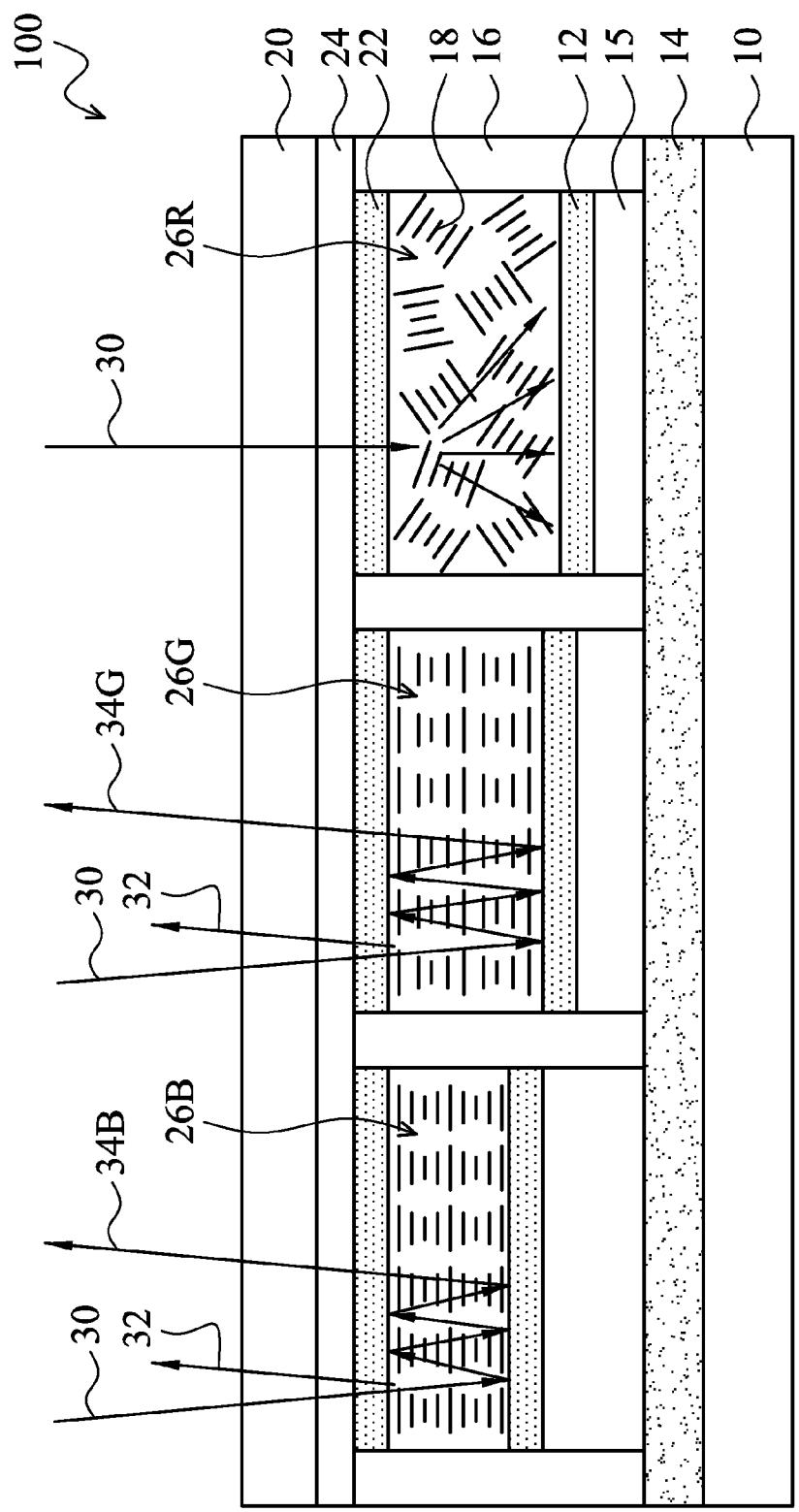
FIG. 3 shows a schematic cross section of a cholesteric liquid crystal device with cavities of three different optical lengths according to an embodiment of the invention.

Referring to FIG. 3, a cross section of a cholesteric liquid crystal device 100 with cavities of three different optical lengths according to an embodiment of the invention is shown. In the cholesteric liquid crystal device 100, a cavity 26R, a cavity 26G and a cavity 26B are formed by a plurality of walls 16 disposed between an upper substrate 20 and a lower substrate 10, a front reflective layer 22 and a rear reflective layer 12. In the spaces surrounded by the walls 16, the upper substrate 20 and a lower substrate 10, a transparent liner layer 15 and the rear reflective layer 12 are formed in sequence on the lower substrate 10, and the front reflective layer 22 is formed on the upper substrate 20, facing the rear reflective layer 12. In the cavity 26R, the cavity 26G and the cavity 26B, the same cholesteric liquid crystal material 18 is filled therein.

In the embodiment, the rear reflective layers 12 in the cavity 26R, the cavity 26G and the cavity 26B have the same thickness, and the front reflective layers 22 in the cavity 26R, the cavity 26G and the cavity 26B also have the same thickness. Thus, optical lengths of the cavity 26R, the cavity 26G and the cavity 26B can be determined by the thickness of the transparent liner layer 15. In the cavity 26R, the cavity 26G and the cavity 26B, the transparent liner layers 15 of various thicknesses are respectively formed over the lower substrate 10 to obtain the cavity 26R, the cavity 26G and the cavity 26B with different optical lengths. In an embodiment, the transparent liner layer 15 may be a transparent electrically conductive layer or a transparent dielectric layer. The material of the transparent electrically conductive layer may be indium tin oxide (ITO). The material of the transparent dielectric layer may be silicon dioxide ($SiO_2$).

In an embodiment, the transparent liner layer 15 is a transparent electrically conductive layer, which can be used as an auxiliary electrode layer. In an embodiment, an extra transparent electrode layer 24, for example an indium tin oxide (ITO) layer may be formed between the upper substrate 20 and the front reflective layers 22 to make up for the conductivity of the front reflective layers 22.

In an embodiment, both the front reflective layer 22 and the rear reflective layer 12 are transflective layers, thus a black light absorption layer 14 is disposed between the lower substrate 10 and the transparent electrically conductive layer 15 or the transparent dielectric layer 15.

In the embodiment, the cavity 26R, the cavity 26G and the cavity 26B have different optical lengths, such that light of different wavelengths are produced through resonance in the cavities to achieve a full color image display. In an embodiment, the optical lengths of the cavity 26R, the cavity 26G and the cavity 26B are for example 400 nm, 360 nm and 300 nm, respectively, for producing a red light, a green light and a blue light, respectively.

In an embodiment, as shown in FIG. 3, the cholesteric liquid crystal layers 18 filled in the cavity 26G and the cavity 26B are of a planar texture (P state), the cholesteric liquid crystal layer 18 filled in the cavity 26R is of a focal conic texture (F state) and the cholesteric liquid crystal layer 18 is a monochromatic cholesteric liquid crystal with a reflection spectrum in an invisible light wave band. Because the optical lengths of the cavity 26R, the cavity 26G and the cavity 26B are designed to produce a red light, a green light and a blue light, respectively, an external light 30 entering the cholesteric liquid crystal device 100 is reflected by the liquid crystal layers 18 filled in the cavity 26G and the cavity 26B to produce an invisible light 32, for example a left-handed or a right-handed infrared (IR) light or ultraviolet (UV) light, and a left-handed and right-handed visible light enter the cholesteric liquid crystal layers 18 in the cavity 26G and the cavity 26B to produce a constructive interference in the cavity 26G and the cavity 26B. A left-handed and right-handed green light 34G is reflected by the rear reflective layer 12 in the cavity 26G, and a left-handed and right-handed blue light 34B is reflected by the rear reflective layer 12 in the cavity 26B. Moreover, the external light 30 entering the cavity 26R is scattered by the cholesteric liquid crystal layers 18 of the focal conic texture (F state) and passes through the transflective rear reflective layer 12 and the transparent liner layer 15 to be absorbed by the black light absorption layer 14. Thus, pixels with the cholesteric liquid crystal layers 18 of the focal conic texture (F state) display a dark state.

Figure 4:
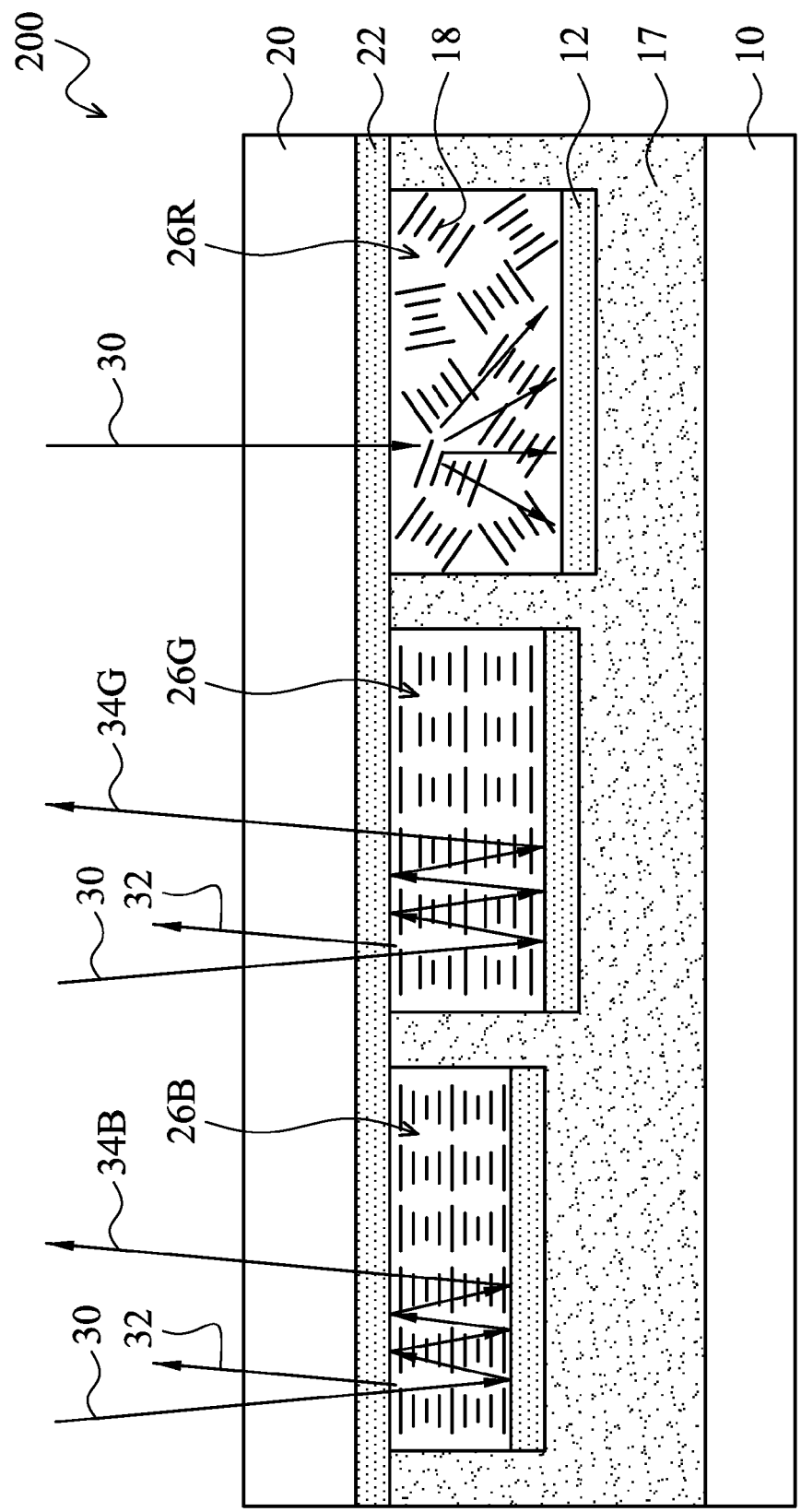
FIG. 4 shows a schematic cross section of a cholesteric liquid crystal device with cavities of three different optical lengths according to another embodiment of the invention.

Referring to FIG. 4, a cross section of a cholesteric liquid crystal device 200 with cavities of three different optical lengths according to another embodiment of the invention is shown. In the cholesteric liquid crystal device 200, a cavity 26R, a cavity 26G and a cavity 26B are formed by a partition structure 17 disposed on a lower substrate 10, a front reflective layer 22 and a rear reflective layer 12. The partition structure 17 has a plurality of depressions with different depths. The rear reflective layer 12 is formed in each depression of the partition structure 17. The front reflective layer 22 may be formed on the entire upper substrate 20. The same cholesteric liquid crystal material 18 is filled in the cavity 26R, the cavity 26G and the cavity 26B.

In the embodiment, the rear reflective layers 12 in the cavity 26R, the cavity 26G and the cavity 26B have the same thickness, such that the optical lengths of the cavity 26R, the cavity 26G and the cavity 26B are determined by the depths of the depressions of the partition structure 17.

In an embodiment, the partition structure 17 is formed from an insulating material, for example a black insulating material with a light absorption character. First, a black light absorption insulating soft material is coated on the lower substrate 10 to form a black light absorption insulating soft film. Then, a mold is provided to be impressed on the black light absorption insulating soft film to form depressions with at least three different depths by a molding process. The rear reflective layer 12 is formed in each depression and then the same cholesteric liquid crystal material 18 is filled in each depression. The upper substrate 20 having the front reflective layer 22 formed thereon is provided and assembled with the lower substrate 10 to form the cholesteric liquid crystal device 200.

In an embodiment, both the front reflective layer 22 and the rear reflective layer 12 are transflective layers. In the embodiment, because the partition structure 17 formed from the black and light absorption insulating material is disposed between the rear reflective layer 12 and the lower substrate 10, the cholesteric liquid crystal device does not require an extra black light absorption layer disposed therein. The partition structure 17 has the function of the black light absorption layer.

In the embodiment, because the cavity 26R, the cavity 26G and the cavity 26B have different optical lengths, light of different wavelengths are produced through resonance in the cavities to achieve a full color image display. In an embodiment, the cholesteric liquid crystal device 200 of FIG. 4 and the cholesteric liquid crystal device 100 of FIG. 3 may have the same display effect, wherein the cholesteric liquid crystal layers 18 filled in the cavity 26G and the cavity 26B are of a planar texture (P state), the cholesteric liquid crystal layer 18 filled in the cavity 26R is of a focal conic texture (F state) and the cholesteric liquid crystal layer 18 is a monochromatic cholesteric liquid crystal with a reflection spectrum in an invisible light wave band. Because the optical lengths of the cavity 26R, the cavity 26G and the cavity 26B are designed to produce a red light, a green light and a blue light, respectively, an external light 30 entering the cholesteric liquid crystal device 200 is reflected by the liquid crystal layers 18 filled in the cavity 26G and the cavity 26B to produce an invisible light 32, for example a left-handed or a right-handed infrared (IR) light or ultraviolet (UV) light, and a left-handed and right-handed visible light enter the cholesteric liquid crystal layers 18 in the cavity 26G and the cavity 26B to produce a constructive interference in the cavity 26G and the cavity 26B. A left-handed and right-handed green light 34G is reflected by the rear reflective layer 12 in the cavity 26G, and a left-handed and right-handed blue light 34B is reflected by the rear reflective layer 12 in the cavity 26B. Moreover, the external light 30 entering the cavity 26R is scattered by the cholesteric liquid crystal layers 18 of the focal conic texture (F state) and passes through the transflective rear reflective layer 12 to be absorbed by the partition structure 17. Thus, pixels with the cholesteric liquid crystal layers 18 of the focal conic texture (F state) display a dark state.

According to an embodiment of the invention, a cholesteric liquid crystal device with a full color display is achieved through using only one layer of the same cholesteric liquid crystal material to cooperate with cavities of different optical lengths. Thus, when compared to the conventional full color cholesteric liquid crystal devices, the cholesteric liquid crystal devices of the invention can save the cost of materials and shorten process time.

Moreover, according to an embodiment of the invention, the cavities of the cholesteric liquid crystal device can reflect a left-handed and right-handed visible light. However, the conventional cholesteric liquid crystal devices can only reflect a single-handed visible light. Therefore, when compared to the conventional cholesteric liquid crystal devices, the cholesteric liquid crystal devices according to the embodiments of the invention have higher brightness.

Furthermore, according to the embodiments of the invention, color purity of the cholesteric liquid crystal devices are enhanced through the reflection indexes of the front reflective layer and the rear reflective layer. As the reflection indexes of the front reflective layer and the rear reflective layer are higher, the wave shape of light reflected by the front reflective layer and the rear reflective layer is sharper. Thus, the color purity shown by the cholesteric liquid crystal devices are higher.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cholesteric liquid crystal device, comprising:
   a first substrate;
   a second substrate disposed opposite to the first substrate;
   a first reflective layer disposed over the first substrate;
   a second reflective layer disposed over the second substrate, facing the first reflective layer;
   a partition structure disposed between the first substrate and the second substrate, wherein at least a first cavity is formed by the partition structure, the first reflective layer and the second reflective layer, and wherein the first cavity has a first optical length; and
   a cholesteric liquid crystal layer, filled in the first cavity.

2. The cholesteric liquid crystal device as claimed in claim 1, wherein the cholesteric liquid crystal layer reflects an invisible light and the first cavity reflects a left-handed and right-handed visible light, and wherein the wavelength of the left-handed and right-handed visible light is determined by the first optical length.

3. The cholesteric liquid crystal device as claimed in claim 1, wherein the cholesteric liquid crystal layer reflects an invisible light of a first wavelength and the first cavity reflects a left-handed and right-handed visible light of a second wavelength, and wherein the first wavelength is different from the second wavelength, and the second wavelength is determined by the first optical length.

4. The cholesteric liquid crystal device as claimed in claim 1, wherein the first reflective layer and the second reflective layer are transflective layers, and further comprise a black light absorption layer disposed between the first reflective layer and the first substrate.

5. The cholesteric liquid crystal device as claimed in claim 4, wherein the material of the first reflective layer and the second reflective layer comprise a metal, and the transflective layers have a thickness of 5 nm to 1000 nm.

6. The cholesteric liquid crystal device as claimed in claim 1, wherein the first reflective layer is an all-reflective layer and the second reflective layer is a transflective layer.

7. The cholesteric liquid crystal device as claimed in claim 6, wherein the material of the first reflective layer and the second reflective layer comprise a metal, and the all-reflective layer has a thickness of 10 nm to 1000 nm.

8. The cholesteric liquid crystal device as claimed in claim 1, wherein the partition structure has a plurality of walls, and further comprises a transparent liner layer disposed between the first reflective layer and the first substrate, and wherein the first optical length of the first cavity is determined by a thickness of the transparent liner layer.

9. The cholesteric liquid crystal device as claimed in claim 8, wherein the transparent liner layer comprises a transparent electrically conductive layer or a transparent dielectric layer.

10. The cholesteric liquid crystal device as claimed in claim 1, further comprising a second cavity disposed between the partition structure, the first reflective layer and the second reflective layer, wherein the second cavity has a second optical length and the cholesteric liquid crystal layer is filled in the second cavity.

11. The cholesteric liquid crystal device as claimed in claim 10, further comprising a third cavity disposed between the partition structure, the first reflective layer and the second reflective layer, wherein the third cavity has a third optical length and the cholesteric liquid crystal layer is filled in the third cavity.

12. The cholesteric liquid crystal device as claimed in claim 11, wherein the first optical length, the second optical length and the third optical length are different from each other.

13. A cholesteric liquid crystal device, comprising:
    a first substrate;
    a second substrate disposed opposite to the first substrate;
    a first reflective layer disposed over the first substrate;
    a second reflective layer disposed over the second substrate, facing the first reflective layer;
    a partition structure disposed between the first substrate and the second substrate to form a first cavity, a second cavity and a third cavity between the partition structure, the first reflective layer and the second reflective layer, wherein the first cavity has a first optical length, the second cavity has a second optical length and the third cavity has a third optical length; and
    a cholesteric liquid crystal layer, filled in the first cavity, the second cavity and the third cavity.

14. The cholesteric liquid crystal device as claimed in claim 13, wherein the cholesteric liquid crystal layer reflects an invisible light of a first wavelength.

15. The cholesteric liquid crystal device as claimed in claim 14, wherein the first cavity reflects a left-handed and right-handed visible light of a second wavelength, the second cavity reflects a left-handed and right-handed visible light of a third wavelength and the third cavity reflects a left-handed and right-handed visible light of a fourth wavelength, and wherein the first wavelength, the second wavelength, the third wavelength and the fourth wavelength are different from each other.

16. The cholesteric liquid crystal device as claimed in claim 15, wherein the second wavelength is determined by the first optical length of the first cavity, the third wavelength is determined by the second optical length of the second cavity, and the fourth wavelength is determined by the third optical length of the third cavity.

17. The cholesteric liquid crystal device as claimed in claim 13, wherein the first reflective layer and the second reflective layer are transflective layers, and further comprise a black light absorption layer disposed between the first reflective layer and the first substrate.

18. The cholesteric liquid crystal device as claimed in claim 13, wherein the first reflective layer is an all-reflective layer and the second reflective layer is a transflective layer.

19. The cholesteric liquid crystal device as claimed in claim 13, wherein the material of the partition structure is a black light absorption insulating material, and the partition structure has a first depression, a second depression and a third depression, and at least the first reflective layer and the cholesteric liquid crystal layer are disposed in sequence in the first depression, the second depression and the third depression, and wherein the first optical length of the first cavity is determined by a depth of the first depression, the second optical length of the second cavity is determined by a depth of the second depression, and the third optical length of the third cavity is determined by a depth of the third depression.

* * * * *